United States Patent [19]
Dieckmann

[11] 3,887,508
[45] June 3, 1975

[54] VINYL HALIDE STABILIZER COMPOSITIONS OF ANTIMONY ORGANIC SULFUR-CONTAINING COMPOUNDS AND METAL CARBOXYLATES

[75] Inventor: Dale J. Dieckmann, Euclid, Ohio

[73] Assignee: Dart Industries Inc., Los Angeles, Calif.

[22] Filed: Nov. 20, 1973

[21] Appl. No.: 417,634

[52] U.S. Cl. ..... 260/23 XA; 252/406; 260/45.75 B; 260/45.85 R
[51] Int. Cl. ............................................. C08f 45/62
[58] Field of Search . 260/45.75 B, 45.85 R, 23 XA; 252/406

[56] References Cited
UNITED STATES PATENTS

| | | | |
|---|---|---|---|
| 2,680,726 | 6/1954 | Weinberg et al. | 260/45.75 |
| 2,684,956 | 7/1954 | Weinberg et al. | 260/45.75 |
| 2,934,548 | 4/1960 | Fath | 260/45.75 |
| 3,347,821 | 10/1967 | Malz et al. | 260/45.75 |

OTHER PUBLICATIONS
British Plastics – May 1954, pp. 176 to 179, Part I

Soaps – by Verity Smith.

*Primary Examiner*—V. P. Hoke
*Attorney, Agent, or Firm*—Wood, Herron & Evans

[57] ABSTRACT

A vinyl halide resin stabilizer composition which essentially contains:
  a. an antimony organic sulfur-containing compound, for example, antimony alkyl mercaptides, antimony mercaptoacid esters and the like, and
  b. an alkali or alkaline earth metal salt of an organic acid, such as Group I or Group II-a Periodic Table metal salts of carboxylic acids.

These compositions synergistically contribute to the long term heat stability of vinyl halide resin compositions and offer significant heat stabilization economies. Efficiencies of the antimony organic compounds are improved in the compositions disclosed thereby permitting the reduction in amounts of such compounds needed for stabilization, and the inhibition of stabilizer exudate from the stabilized resin.

16 Claims, No Drawings

VINYL HALIDE STABILIZER COMPOSITIONS OF ANTIMONY ORGANIC SULFUR-CONTAINING COMPOUNDS AND METAL CARBOXYLATES

BACKGROUND OF THE INVENTION

Antimony mercaptides have been proposed as stabilizers for vinyl halide resins to guard against degradation by heat during molding and working of the resin into useful articles. Prior art patents which disclose such antimony organic sulfurcontaining compounds and their utility as stabilizers include U.S. Pat. Nos. 2,680,726; 2,684,956; 3,340,285; 3,399,220; 3,466,261 and 3,530,158. In commercial practice, however, the antimony mercaptides have not been widely used as stabilizers because of various shortcomings including, for example, their propensity to exude from molded or worked PVC plastic stock, cost or lack of other advantages associated with their use which might outweigh such shortcomings. Therefore, antimony mercaptides and similar antimony organic compounds as stabilizers for vinyl halide resins have heretofore had limited utility in comparison to other organometalic stabilizers.

SUMMARY OF THE INVENTION

The present invention is directed to improvements in vinyl halide resin stabilizer systems of antimony organic sulfur-containing compounds. This invention expands the utility of such antimony compounds as stabilizers and offers advantages over known stabilizer compositions. Efficiencies of antimony organic sulfur-containing compounds are significantly improved according to the principles of this invention thereby enabling the reduction in amounts of such compounds needed in resin stabilizer compositions and thereby also inhibiting exudation from molded plastics. These and other advantages will become apparent in the following detailed description.

This invention is predicated in part upon the unexpected heat stabilization of vinyl halide resins by antimony organic sulfur-containing compounds in combination with metal carboxylates. In particular, a metal carboxylate selected from the group consisting of an alkali or alkaline earth metal salt of a carboxylic or thiocarboxylic acid, and mixtures thereof, and an antimony organic sulfur-containing compound together contribute highly unexpected heat stabilization to a vinyl halide resin. It has been found that synergistic heat stabilizations are provided by such compositions, i.e., the sum of the stabilizing effects of an amount of each component alone upon the resin is exceeded when the same amounts of components are together in the vinyl halide resin formula. Such unexpected results and other advantages are empirically demonstrated in numerous operating examples of this invention, and a further understanding thereof will become apparent in view of the detailed description herein. In the stabilizer compositions of antimony organic sulfur-containing compounds and metal carboxylates of this invention, the benefits of stablization can be realized over broad ranges of both total parts by weight of the stabilizer compositions in the vinyl halide resin and the weight ratios of each of the components with respect to the other. Particularly useful stabilizer compositions of this invention are achieved with a total parts by weight range on the order of about 0.2 to about 8 parts by weight based upon 100 parts by weight (phr) of the vinyl halide resin. A most useful range of total parts by weight of stabilizer compositions is on the order of about 0.2 to about 6 phr and this depends upon the desired heat stability in a particular vinyl halide resin composition consistent with other requirements and economies.

There are certain generally preferred weight ratios of the antimony organic sulfur-containing compounds relative to a particular metal carboxylate. This will become apparent in view of the detailed operating examples. However, it is to be emphasized that the most desirable weight ratios of each of the essential components of the composition of this invention for a particular application and resin system can be arrived at in accordance with the teachings of this invention. Thus, in its broader aspects, this invention is not limited to weight ratios of components. It has been found that synergistic stabilization levels of a particular metal carboxylate and a particular antimony organic sulfur-containing compound will vary as exemplified by the combination of calcium stearate and antimony tris (isooctylthioglycolate). This combination has a synergistic effectiveness when an amount in the range of 0.1-2 phr of calcium stearate is combined with an amount of the antimony compound in the range of about 0.1-2 phr. Higher levels of each component may be used. In contrast, the calcium stearate alone in the vinyl halide resin will not materially contribute any heat stability to the resin. On the other hand, the heat stability of a vinyl halide resin is enhanced with increasing amounts of the antimony compound employed by itself in the 0.1-2 phr range. But, when the amounts of such an antimony compound are employed with amounts of otherwise ineffective calcium stearate, heat stabilities are achieved which far exceed the expected results. Efficient stabilization can be achieved at low use levels of the antimony compound with inhibition of antimony compound exudation. In general, the combination of metal carboxylate with the antimony organic sulfur-containing compound is utilized at total parts on the order of about 0.2 to about 8 phr; and where the metal carboxylate is within the range of about 0.1 to about 5 phr and the antimony compound is in the range of about 0.1 to about 3 phr.

ANTIMONY ORGANIC SULFUR-CONTAINING COMPOUND

The antimony organic sulfur-containing compounds which are of use in this invention are generally characterized as having the Sb-S group or linkage. Generally, most antimony organic compounds suitable for use in this invention are derived from trivalent antimony and include mercaptides which may be characterized by the following formula:

Formula I. Sb (SR)$_3$ wherein R represents hydrocarbon or substituted hydrocarbon radicals such as those selected from the group consisting of alkyl, aryl or aralkyl. Examples of such groups are alkyls such as ethyl, propyl, butyl, octyl, nonyl, lauryl and octadecyl; aryls and aralkyls such as phenyl, benzyl, naphthyl, xylyl or phenyl ethyl and the like. The group SR of Formula I, for instance, may be the rest of a mercaptan or mercapto alcohol. As indicated, aliphatic and aromatic mercaptans may be employed to form the group SR. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, and others. As examples of suitable mercapto alcohols, monothioethylene glycol, monothiopropylene glycol, thioglycerol, thiodiethylene glycol, and others may be mentioned. Specific examples of such antimony mercaptides are antimony trilaurylmercaptide, antimony triphenylmercaptide and antimony tribenzylmercaptide. Patents exemplifying this formula $Sb(SR)_3$ or a similar formula and a definition of compounds represented thereby include U.S. Pat. Nos. 2,684,956 and 3,466,261, among others.

Antimony organic sulfure-containing compounds other than the antimony mercaptides of the Formula I above, are suitable for use according to this invention. Such compounds are generally termed antimony mercaptoacid esters which may be further defined by the following formula:

Formula II. $Sb(SRCOOR')_3$ wherein R is selected from the group consisting of alkylene, arylene, and aralkylene radicals and R' is a substituted or unsubstituted alkyl, aryl or mixed aryl-alkyl group. Thus R may be derived from mercapto acetic, $\beta$-mercaptopropionic, thiomalic, thiosalicyclic acids, etc. Similarly, R' may be derived from decanols, glycerol, glycol, monoesters, dihydroabietyl alcohol, phenoxyethanol, etc. Particularly suitable are the esters of mercapto alcohols, such as thioglycols, in which the hydroxy groups are esterified by an aliphatic, aromatic, or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic mercapto acids, such as esters of beta thiopropionic acid, thiolactic acid, thiobutyric acid and mercapto lauric acid. Specific examples of antimony mercaptoacid esters include antimony tris (isooctylthioglycolate), antimony tris (glycoldimercaptoacetate), antimony tris (dodecylthioglycolate), dodecylmercaptoantimony bis (isooctylthioglycolate), and antimony tris (isooctyl - $\beta$ - mercaptopropionate). Patents exemplifying Formula II or a similar formula and a definition of compounds represented thereby include U.S. Pat. Nos. 2,680,726 and 3,530,158, among others.

The antimony organic sulfur-containing compounds having the SbS group represented by Formulas I and II come within the scope of a broader characterization illustrated by the following formula:

Formula III. $R_nSbX_{3-n}$ wherein R is selected from the group consisting of alkyl, alkenyl, alkynyl, aryl, cycloalkyl, and cycloalkenyl, X is selected from the group consisting of sulfide or mercaptide and n is an integer of 0 to 2. In the compounds, $R_nSbX_{3-n}$ which may be used in practice of this invention, R may be alkyl, cycloalkyl, alkenyl, cycloalkenyl, alkynyl, or aryl including such groups when inertly substituted. When R is alkyl, it may include methyl, ethyl, n-propyl, i-propyl, n-butyl, i-butyl, n-amyl, n-octyl, 2-ethylhexyl, etc. as well as substituted alkyls including phenylethyl, benzyl, etc. Typical alkenyl groups which may be employed may include vinyl, 2-propenyl (i.e. allyl), 1-propenyl, 1-butenyl, 2-butenyl, etc. as well as inertly substituted alkenyl groups typified by 4-phenyl, buten-1-yl, etc. Typical cycloalkyl groups may include cyclohexyl, cycloheptyl, cyclooctyl as well as inertly substituted cycloalkyl groups including 2-methyl cycloheptyl, 3-butyl cyclohexyl, 3-methylcyclohexyl, etc. Typical alkynyl groups which may be employed include propyn-1-yl, propyn-2-yl, butyn-1-yl, phenylethynyl, ethynyl, etc. Typical aryl groups which may be employed may include phenyl, tolyl, xylyl, chlorophenyl, dimethylaminophenyl, etc. Where several R groups may be present, they may be the same or different. Typical mercaptides include phenyl mercaptide, lauryl mercaptide, butyl mercaptide, etc. Specific compounds when $n$ is 1 or 2 include n-butyl antimony dilaurylmercaptide, n-butyl antimony sulfide, di-n-butyl antimony lauryl mercaptide, diphenyl antimony lauryl mercaptide, ditolyl antimony n-amyl mercaptide, dibenzyl antimony benzyl mercaptide, diallyl antimony cyclohexyl mercaptide, diphenyl antimony allylmercaptide, dicyclohexyl antimony n-hexyl mercaptide, ditolyl antimony phenyl mercaptide, di-isopropyl antimony 2-ethylhexyl mercaptide, di-p-chlorophenyl antimony n-butyl mercaptide, diphenyl antimony ethyl mercaptoacetate. Patents exemplifying such antimony compounds include U.S. Pat. Nos. 3,530,158 and 3,399,220. Of course, it is apparent that antimony mercaptides, antimony mercapto acids, antimony mercaptoacid esters, etc., per se form no part of this invention and the mentioned patents and their specific disclosures clearly teach these compounds and their method of production to enable anyone of ordinary skill to use them in carrying out this invention.

METAL CARBOXYLATE

The alkali or alkaline earth metal salts of carboxylic acids, including monocarboxylic as well as dicarboxylic acids, which are used in this invention are characterized by the formula:

Formula IV. $(RCXX)_nM$ wherein the group RCXX is the carboxylate and/or thiocarboxylate group of an aliphatic or aromatic mono or polyfunctional acid containing, for example, about $C_2$–$C_{54}$ carbon atoms; R is a hydrocarbon or substituted hydrocarbon radical; X is oxygen and/or sulfur; $n$ is an integral number from 1–2 and M is an alkali or alkaline earth metal, for example, sodium, potassium, lithium, magnesium, calcium, strontium and barium. The metals include Group I or Group II-a metals of the Periodic Table. These alkali or alkaline earth metal salts, or "carboxylates" as they are sometimes conveniently termed, have been widely developed in the art and are usually prepared by either a fusion or a double decomposition type reaction. In the direct fusion reaction, one equivalent of the organic acid is reacted with one equivalent of an alkaline or alkaline earth metal oxide or hydroxide at elevated temperatures. In the double decomposition reaction or precipitation reaction, the alkali salt or the sodium salt of the organo carboxylate is reacted with an equivalent amount of alkaline earth chloride or sulfate in aqueous media. Reference may be had to literature for methods of preparation and other examples of these organic acid salts such as S. B. Elliott, "The Alkaline Earth and Heavy Metal Soaps," Reinhold Publishing Co., N.Y., 1946; McGraw-Hill Encyclopedia of Science and Technology, p. 393, Vol. 12, 1960; "Fatty Acids and Their Derivatives," A. W. Ralston, Pp. 887–903, John Wiley & Sons, Inc., New York, 1948; "Fatty Acids and Their Industrial Applications," E. Scott Pattison, Pp. 209–220, Marcel Dekker, Inc., New York, 1968; "The Stabilization of Polyvinyl Chloride," Fernand Chevassus, Pp. 108–117, 137, St. Martin's Press, Inc., New York, 1968 and *Mod. Chem.*, April–May Pp. 1, 4, 6, 12 and 13 (1967).

The most useful metal salts of organic acids in accordance with the principles of this invention are those with lubricating characteristics such as the metal salts of fatty acids, more particularly, about $C_8$–$C_{24}$ monocarboxylic acids such as lauric and stearic acids; saponified synthetic fatty acids of about $C_{24}$–$C_{54}$ such as $C_{36}$ or $C_{54}$ dimer and trimer acids; and partially saponified ester waxes such as Hoechst Wax OP which is an ester of montan wax partially saponified with lime, e.g., $C_{28}$–$C_{32}$ carboxylic acids which are partially esterified with a dihydric alcohol and then saponified with lime to produce partially saponified ester waxes. However, although the lubricating metal salts are most useful, non-lubricating carboxylates such as acetates, benzoates or 2-ethyl hexoates are suitable.

The above cited literature references demonstrate that alkali and alkaline earth metal salts of carboxylic or thiocarboxylic acids and their methods of preparation have been widely developed in the art. Of course, these compounds per se as well as their methods of preparation form no part of this invention, and their employment in vinyl halide formulations as lubricating agents has heretofore been established. Specific examples of metal carboxylates for use in this invention include sodium stearate, lithium stearate, calcium stearate, calcium octoate, calcium laurate, barium laurate, barium stearate, magnesium stearate, barium octoate, and strontium stearate. Of course, combinations of the various cationic metals with the organic carboxylate groups can be employed such as barium/magnesium carboxylates, barium/calcium carboxylates and the like of any of the mentioned carboxylate ions. Similarly, aromatic carboxylates of the phthalic, benzoic, naphthoic type where R is aryl, diaryl or substitute aryl may be employed such as calcium benzoate. These organic acids may contain nonhydrocarbon substituents such as hydroxyl, mercapto, thioglycol, alkoxy, and the like.

The principles of this invention and its operating parameters will be further understood with reference to the following detailed examples which serve to illustrate the types of specific materials and their amounts as used in typical vinyl halide resin formulations and the synergisms displayed by the essential combination of components in the stabilizer composition according to this invention. These examples are considered to be exemplary of this invention, and should not be considered as limiting, especially in view of applicants' broad disclosure of principles of this invention.

In the examples which follow, a standard resin formula was employed which contained 200 parts by weight of polyvinyl chloride homopolymer which is characterized as a white powder having a particle size such that 100 percent passes through a 42 mesh screen at a specific gravity of 1.40 (Geon 103 EP by B. F. Goodrich). Included in the standard resin formula is also 6 parts by weight of a processing aid which is an acrylic polymer in powdered form which improves the hot processing of rigid and plasticized vinyl compounds. (Acryloid K12ON by Rohm and Haas Company). This material is a fine, white free flowing powder having a bulk density at about 0.30 grams per cc and a viscosity, 10 percent in toluene, at 600 cps (Brookfield). The processing aid merely facilitates hot processing and forms no part of this invention. A paraffin wax lubricant, i.e., a commercial wax designated 165 (H. M. Royal, Inc.) was also employed at 2 parts by weight in the resin formula. The term "standard resin blank" or just "blank" is used hereinafter to designate the standard resin formula without heat stabilizer additives. Various combinations of the antimony organic sulfur-containing compounds and metal carboxylates were mixed into the standard resin formula according to the following examples on a parts by weight basis. All amounts of such stabilizer components, in the tables and examples unless otherwise indicated, are on a parts per hundred resin basis, or as indicated above, simply "phr." The blank resin formula with and without stabilizer additives are tested in the following examples by first milling the mixtures to form a uniform polyvinylchloride composition for five minutes at 350°F, after which time long term heat stabilities of test samples were determined by oven treatment at 375°F as indicated. The heat stability contribution of the stabilizer compositions (or components thereof) hereinafter are determined by ascertaining the number of minutes at the test temperature required for the samples to degrade by severe darkening to a dark red or black. Thus, the term "heat stability contribution" is used to indicate the amount of heat stability in minutes contributed by a composition or component to the resin blank formula.

EXAMPLES 1–36

In Examples 1–36, the synergistic performance of the combination of calcium stearate and antimony tris (isooctylthioglycolate), hereinafter "ATG," was demonstrated. For this purpose, the heat stability of the standard resin blank in the absence of either the antimony organic compound or metal carboxylate was determined by milling at 350°F and long term heat stability testing at 375°F. The standard resin blank was pink or orange off the mill and darkened within about 10 minutes at 375°F. This demonstrated that the blank resin will degrade quickly. This blank was thus given the numerical designation 0 at zero parts of either component, as shown in the upper left hand corner of Table I. For comparison with the standard resin blank, varying amounts of calcium stearate over the range of about 0.1 to about 2 phr were employed alone. The results of these examples are shown in the first horizontal line of Table I. Also, a series of examples in which the standard resin formula was combined with ATG alone were performed for comparison. The results of these examples are shown in the first vertical line of Table I. Then, the combinations of calcium stearate and ATG varying in amounts of 0.1–2 phr of calcium stearate with 0.1–2 phr ATG were performed to illustrate the synergistic heat stabilizing effects in minutes.

Table I which follows demonstrates the results of the Examples 1–36. The times in minutes reported in Table I for darkening or blackening take into account the standard resin blank which degraded within about 10 minutes of heat stability testing. In other words, the time in minutes recorded at various levels for calcium carboxylate and ATG alone, and in combination with one another, represent the "contribution" in minutes of either one or both of these components to the standard resin blank.

TABLE I

|  |  | Calcium Stearate | | | | | |
|---|---|---|---|---|---|---|---|
|  |  | 0 | .1 | .25 | .5 | 1.0 | 2.0 |
|  | 0 | 0' | 0' | 0' | 0' | 0' | 0' |
|  | .1 | 10' | 10' | 15' | 20' | 30' | 35' |
|  | .25 | 20' | 20' | 20' | 30' | 40' | 50' |
| ATG | .5 | 30' | 35' | 40' | 50' | 60' | 70' |
|  | 1.0 | 50' | 60' | 70' | 70' | 95' | 95' |
|  | 2.0 | 90' | 110' | 110' | 125' | 140' | 95' |

Table I demonstrates that at 0.1–2 phr of calcium stearate alone, stability of the blank was not improved. In fact, the stability of the blank was lessened because the test samples turned a darker red than the blank within 10 minutes. In contrast, the ATG alone at about 0.1 phr contributed about 10 minutes of heat stabilizing effectiveness to the blank and, with increasing amounts up to 2 phr, the heat stability was enhanced to about 90 minutes. Therefore, in general, the calcium stearate component of the stabilizer combination does not contribute to, and even lessens, the heat stability of the blank formula. Whereas, ATG with increasing amounts contributed to the heat stability of the blank.

Table I also demonstrates, at a low level of calcium stearate on the order of 0.1 phr in combination with 0.1–0.25 phr ATG, unexpected heat stability was not clearly observed. Quite similarly, when ATC on the order of 0.25 phr was combined with 0.25 phr of calcium stearate, unexpected heat stability was not clearly observed. However, when calcium stearate within the range of 0.1 to about 2 phr was combined with ATG at various levels from about 0.1 to 2 phr, significant synergism was observed. To illustrate this, reference is made to Table I in which 1 part of calcium stearate alone did not contribute heat stability to the blank. For comparison, one part of ATG contributed about 50 minutes of heat stability to the blank. Thus, the expected heat stability of a combination of 1 phr of calcium stearate and 1 phr ATG should have been about 50 minutes or less. However, as demonstrated by Table I, the heat stability of such a combination was 95 minutes and synergism thus was clearly demonstrated.

More generally, Table I demonstrates that in the range of 0.1–2 phr of calcium stearate, there was a level of ATG in the range of 0.1–2 phr which when combined with the calcium stearate provided for a synergistic result. Such levels are easily determined from Table I. As highlighted in the area below and to the right of the double black lines of Table I, with few exceptions, principally in the very low phr of each component of the combination tested, synergistic combinations were observed. Such a comprehensive demonstration can be extended to other higher levels of components and a similar table can be prepared to ascertain all levels of synergism for the combinations of all components according to the principles of this invention. However, within the teachings of this invention, one of ordinary skill can attend to such further details.

EXAMPLES 37–45

These examples demonstrated the synergistic combination of other alkaline metal carboxylates and an antimony organic sulfur-containing compound, that is ATG, for comparison with the calcium stearate of the previous examples. In these examples, the activities of barium stearate, magnesium stearate and strontium stearate were compared with calcium stearate. Each of the metal carboxylates was employed alone and in combination with ATG in the standard formula except that the wax 165 was reduced to 0.5 phr and the processing aid was eliminated. The heat stabilizing effectiveness upon milling of each sample at 350°F followed by oven testing at 375°F, as in Examples 1–36 above, is reported in Table II.

TABLE II

|  | Components | 375° F Heat Stability Contribution |
|---|---|---|
| Example 37 | 0.5 ATG | 30' |
| Example 38 | 0.5 calcium stearate | 0' |
| Example 39 | 0.5 ATG | |
|  | 0.5 calcium stearate | 50' |
| Example 40 | 0.5 barium stearate | 0' |
| Example 41 | 0.5 ATG | |
|  | 0.5 barium stearate | 50' |
| Example 42 | 0.5 magnesium stearate | 0' |
| Example 43 | 0.5 ATG | |
|  | 0.5 magnesium stearate | 40' |
| Example 44 | 0.5 strontium stearate | 0' |
| Example 45 | 0.5 ATG | |
|  | 0.5 strontium stearate | 50' |

Table II thus demonstrates that other alkaline metal carboxylates behave similarly to calcium stearate. Alone, such carboxylates do not exhibit an extension of heat stability of the resin blank at 375°F. Refer to Examples 38, 40, 42 and 44. However, when barium, magnesium and strontium stearates were employed in the same amounts with antimony tris (isooctylthioglycolate), i.e. ATG, heat stability synergisms of the combination were observed. For instance, in Example 41 at 0.5 phr ATG and 0.5 phr barium stearate, a heat stability of 50 minutes was contributed to the blank. In contrast, the expected heat stability of such a combination would have been only about 30 minutes since 0.5 parts of barium stearate alone did not contribute to the heat stability of the blank and 0.5 part ATG contributed only 30 minutes (Example 37). Accordingly, the 50 minutes heat stability for the combination far exceeded the expected heat stability of only 30 minutes, judging from the performance of each of the components alone. Quite similarly, Examples 43 and 45 at the levels of the ATG and metal carboxylate shown, illustrated a synergistic effectiveness of about 40 minutes and 50 minutes, respectively, in comparison to the expected heat stability of only 30 minutes based on the performance of each of the components alone.

Therefore, Examples 37–45 demonstrated that an antimony organic sulfur-containing compound (ATG) and an alkaline metal carboxylate in combination provided a vinyl halide resin stabilization which was indeed superior and highly unexpected. Having demonstrated the stabilizing effectiveness of the combination of other alkaline metal carboxylates and ATG, other levels in a manner similar to Table I can be developed for practical purposes where synergistic results can be achieved.

EXAMPLES 46–49

The principles of this invention are further illustrated by employing other antimony organic sulfur-containing compounds and metal carboxylates. For these purposes, Examples 46–49 were performed. In these examples, antimony tris (isooctylmercaptopropionate) and antimony tris (laurylmercaptide) was substituted for the antimony tris (isooctylthioglycolate) of the previous examples. Hereinafter, the antimony tris (isooctylmercaptopropionate) is designated "ATP" and antimony tris (laurylmercaptide) is designated "ATL." Milling and oven testing for heat stability was performed as above in Examples 37–45. The ATP and ATL were employed alone and in combination with calcium stearate in phr as listed in Table III.

TABLE III

| | Components | 375° F Heat Stability Contribution |
|---|---|---|
| Example 46 | 0.5 ATP | 20' |
| Example 47 | 0.5 ATP 0.5 calcium stearate | 35' |
| Example 48 | 0.5 ATL | 10' |
| Example 49 | 0.5 ATL 0.5 calcium stearate | 25' |

As reported in Example 38, calcium stearate alone at a level of 0.5 phr contributed no heat stabilizing effectiveness upon the blank. Also, as reported in Table III above, ATP at 0.5 phr contributed 20 minutes of heat stability to a resin blank. However, a combination of 0.5 phr ATP and 0.5 phr calcium stearate displayed a heat stabilizing effectiveness of about 35 minutes upon the resin (Example 47). In comparison, the expected heat stability contribution of such a combination was about 20 minutes because at a level of 0.5 calcium stearate alone did not contribute to the heat stability of the resin and the ATP alone contributed about 20 minutes of heat stability. Accordingly, the synergistic effectiveness of the combination was demonstrated. In Example 49, quite similarly, at a level of 0.5 phr ATL and 0.5 phr calcium stearate, a heat stability contribution of 25 minutes was observed. This is to be compared with an expected heat stability of each of the components in the combination on the order of about 10 minutes. Again, quite unexpectedly, the heat stability of the combination was 15 minutes or 150 percent greater and far exceeded the expected heat stabilizing effectiveness.

EXAMPLES 50–53

For the purpose of illustrating the synergistic activity of the stabilizer compositions of this invention with alkali metal carboxylates, Examples 50–53 were performed. Examples 50–53 were performed under identical formulation and milling conditions with over testing at 375°F, as Examples 37–45, except that 0.5 phr of sodium stearate was employed alone as a stabilizer in Example 50, 0.5 phr of lithium stearate alone was employed in Example 51 as a substitute for an alkaline earth metal carboxylate. Examples 52 and 53 employed the combination of components according to the principles of this invention. 0.5 phr ATG and 0.5 phr sodium stearate were combined in Example 52; and 0.5 phr ATG and 0.5 phr lithium stearate were combined in Example 53. The results of oven heat stability testing appear in Table IV.

TABLE IV

| | Components | 375° F Heat Stability Contribution |
|---|---|---|
| Example 50 | 0.5 sodium stearate | 0' |
| Example 51 | 0.5 lithium stearate | 0' |
| Example 52 | 0.5 sodium stearate 0.5 ATG | 40' |
| Example 53 | 0.5 lithium stearate 0.5 ATG | 40' |

Examples 50–53 demonstrated the heat stabilizing synergistic effectiveness of the composition of this invention with alkali metal carboxylates. The sodium stearate or lithium stearate at 0.5 phr alone provided little or no contribution to the heat stabilizing effectiveness of the resin blank itself (as demonstrated by Examples 50 and 51 which became red upon milling and had a color degradation similar to the resin blank itself within about 10 minutes at 375°F). As demonstrated previously, 0.5 phr of ATG alone (Example 37) contributed a heat stabilizing effectiveness of about 30 minutes. However, the synergistic combination of either 0.5 phr sodium stearate or 0.5 lithium stearate with 0.5 phr ATG (as demonstrated by Examples 52 and 53) contributed 40 minutes of heat stability to the blank.

EXAMPLES 54–60

The synergistic effectiveness of other metal carboxylates in combination with an antimony organic sulfur-containing compound (ATG) was demonstrated by Examples 54–60. To the standard resin formula, 0.5 phr ATG was added alone (Example 54). For comparison, 1.0 phr of each calcium stearate, calcium benzoate and calcium laurate were added alone to the resin blank (Examples 55–57). Then, the combinations of components were made in Examples 58–60 and the results are reported in Table V, after milling for 5 minutes at 350°F and oven testing at 375°F.

TABLE V

| | Components | 375° F Heat Stability Contribution |
|---|---|---|
| Example 54 | 0.5 ATG | 30' |
| Example 55 | 1.0 calcium stearate | 0' |
| Example 56 | 1.0 calcium benzoate | 0' |
| Example 57 | 1.0 calcium laurate | 0' |
| Example 58 | 1.0 calcium stearate 0.5 ATG | 60' |
| Example 59 | 1.0 calcium benzoate 0.5 ATG | 50' |
| Example 60 | 1.0 calcium laurate 0.5 ATG | 60' |

Table V demonstrates that various calcium carboxylates of the aliphatic monocarboxylic acid and the aromatic monocarboxylic type of about $C_2$ to about $C_{32}$ carbon atoms will provide the advantageous results according to this invention. Calcium salts of fatty acids, e.g., calcium stearate and calcium laurate, behave better than calcium benzoate. As mentioned in the description of this invention, the nonlubricating alkaline earth metal salts of aromatic carboxylic acids are suitable for use in this invention as well as the lubricating fatty acid salts.

EXAMPLES 61–66

Other antimony organic compounds have displayed synergisms with metal carboxylates. In this series of examples, dodecylmercaptoantimony bis (isooctylthioglycolate), i.e., "DATG;" antimony tris (glycoldimercaptoacetate), i.e., "ATA;" and antimony tris (dodecylthioglycolate), i.e., "ATD" were employed with calcium stearate. The components of Table VI were added to the standard blank formula and tested for heat stability as above and the results are reported as follows:

TABLE VI

| | Components | 375° F Heat Stability Contribution |
|---|---|---|
| Example 61 | 0.5 DATG | 30' |
| Example 62 | 0.5 DATG 1.0 calcium stearate | 50' |
| Example 63 | 0.5 ATA | 30' |
| Example 64 | 0.5 ATA 1.0 calcium stearate | 60' |
| Example 65 | 0.5 ATD | 30' |
| Example 66 | 0.5 ATD 1.0 calcium stearate | 50' |

Table VI further demonstrates the wide latitude of antimony organic sulfur-containing compounds having synergistic heat stabilizing activities with metal carboxylates according to this invention.

In each of the above examples, the vinyl halide resin which was employed is a homopolymer of vinyl chloride, i.e. polyvinyl chloride. It is to be understood, however, that this invention is not limited to a particular vinyl halide resin such as polyvinyl chloride. Other halogen-containing resins which are employed and illustrate the principles of this invention include chlorinated polyethylene, chlorinated polyvinyl chloride and the vinyl halide resin type. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride $H_2C:CHCl$ to polyvinyl chloride $(CH_2—CHCl—)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers; and the like. Of course, the vinyl halide commonly used in the industry is the chloride, although others such as bromide and fluoride may be used. Examples of the latter polymers include polyvinyl bromide, polyvinyl fluoride, and copolymers thereof.

It is also to be understood that the stabilizer compositions of this invention and the vinyl halide resins may include the presence of other ingredients which do not materially alter the novel and advantageous characteristics of this invention. However, it has been discovered that certain components may inhibit or hinder the synergistic action of the antimony compound and metal carboxylate components of this invention. For example, I have found that an alkylaryl phosphate such as 2-ethylhexyl diphenyl phosphate materially alters or hinders the synergistic activity of an antimony mercaptoacid ester and calcium stearate. Comparative tests were made to illustrate this discovery, 100 parts by weight polyvinyl chloride, 50 parts by weight of dioctyl phthalate and 2 parts by weight of antimony tris (isooctylthioglycolate) were formulated for testing by milling at 340°F for 5 minutes and oven testing at 15 minute intervals at 375°F in comparative Test No. 1. The same ingredients of Test sample No. 1 with only 40 parts of dioctyl phthalate and the inclusion of 10 parts by weight of alkylaryl phosphate (2-ethylhexyl diphenyl phosphate) and 0.5 part by weight of calcium stearate following the suggestion of U.S. Pat. No. 2,680,726 at Columns 3–4, was formulated as Test sample No. 2 and heat stability was again determined. Then, Test sample No. 3 was performed in which only 0.5 part by weight of calcium stearate was added to the ingredients of Test sample No. 1 and heat stability was determined in the same manner as the other test samples. The results of these comparative tests demonstrated that Test sample No. 1 darkened at about 90 minutes and Test sample No. 2 darkened at about 90 minutes or slightly earlier. In contrast, Test sample No. 3 did not darken until about 105 minutes. Therefore, the presence of the alkaryl phosphate in Test sample No. 2 was found to materially alter or hinder the heat stabilizing activity of the antimony organic sulfur-containing compound and metal carboxylate. In contrast, Test sample No. 3 in accord with the principles of this invention synergistically extended the heat stability of the resin formula about 15 minutes.

Accordingly, the numerous empirical examples above, coupled with the detailed description define the present best modes of practicing this invention and it will become apparent in view thereof that one of ordinary skill may practice similar modes within the scope of this invention.

What is claimed is:

1. A vinyl halide resin heat stabilizer composition which consists essentially of, an antimony organic sulfur-containing compound having the formula $$R_nSbX_{3-n}$$

where R of the formula is selected from the group consisting of alkyl, alkenyl, alkynyl, aryl, cycloalkyl, cycloalkenyl, mixed aryl-alkyl, and substituted groups thereof, where X of the formula is selected from the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof, where n is an integer of 0 to 2, and a metal carboxylate selected from the group consisting of an alkali or alkaline earth metal salt of a carboxylic or thiocarboxylic acid, and mixtures thereof, said antimony compound and metal carboxylate components in relative amounts which together provide a synergistic heat stabilizing effectiveness upon said resin.

2. A stabilized polymer composition comprising polyvinyl chloride and a stabilizing amount of the stabilizer composition of claim 1.

3. The composition of claim 1 wherein said metal salt is the carboxylic acid salt.

4. The composition of claim 3 wherein said acid is a fatty acid.

5. The composition of claim 1 wherein said acid contains about $C_2$–$C_{54}$ carbon atoms.

6. The composition of claim 3 wherein said acid is an aliphatic monocarboxylic acid which contains about $C_8$–$C_{32}$ carbon atoms.

7. The composition of claim 1 wherein said components are present in a weight ratio in the range of about 0.1–3 of the antimony compound to about 0.1–5 of the metal carboxylate.

8. A vinyl halide resin composition which comprises a vinyl halide resin and, as a heat stabilizer, an effective amount of a composition consisting essentially of,
an antimony organic sulfur-containing compound having the formula $$R_nSbX_{3-n}$$

where R of the formula is selected from the group consisting of alkyl, alkenyl, alkynyl, aryl, cycloalkyl, cycloalkenyl, mixed aryl-alkyl, and substituted groups thereof, wherein X of the formula is selected from the group consisting of sulfur, SR and SRCOOR′, where R of the group SR is selected from alkyl, aryl, mixed aryl-alkyl, and substituted groups thereof, where R of the group SRCOOR′ is selected from alkylene, arylene, aralkylene, and substituted groups thereof, wherein R′ of the group SRCOOR′ is selected from alkyl, aryl, mixed aryl-alkyl, and substituted groups thereof, where $n$ is an integer of 0 to 2, and
a metal carboxylate selected from the group consisting of an alkali or alkaline earth metal salt of a carboxylic or thiocarboxylic acid, and mixtures thereof, said antimony compound and metal carboxylate components in relative amounts which together provide a synergistic heat stabilizing effectiveness upon said resin.

9. The composition of claim 8 wherein said vinyl halide resin is vinyl chloride-containing resin.

10. The composition of claim 9 wherein said metal salt is the carboxylic acid salt.

11. The composition of claim 10 wherein said acid is a fatty acid.

12. The composition of claim 8 wherein said effective amount is on the order of about 0.2 to about 8 parts by weight per 100 parts resin.

13. The composition of claim 12 wherein the relative amount of said antimony compound is in the range of about 0.1 to about 3 parts by weight per 100 parts resin and the relative amount of metal carboxylate present is in the range of about 0.1 to about 5 parts by weight per 100 parts resin.

14. A vinyl halide resin composition which comprises a vinyl chloride resin and, as a heat stabilizer, an effective amount of a composition consisting essentially of,
an antimony organic sulfur-containing compound selected from the group consisting of antimony tris (isooctylthioglycolate), antimony tris (laurylmercaptide), antimony tris (isooctylmercaptopropionate), dodecylmercaptoantimony bis (isooctylthioglycolate), antimony tris (glycoldimercaptoacetate), antimony tris (dodecylthioglycolate), and mixtures thereof, and
a metal carboxylate selected from the group consisting of sodium stearate, lithium stearate, barium stearate, calcium stearate, strontium stearate, magnesium stearate, calcium laurate, calcium benzoate, and mixtures thereof, said antimony compound and metal carboxylate components in relative amounts which together provide a synergistic heat stabilizing effectiveness upon said resin.

15. The composition of claim 14 wherein said effective amount is on the order of about 0.2 to about 8 parts by weight per 100 parts resin.

16. The composition of claim 15 wherein the relative amount of said antimony compound is in the range of about 0.1 to about 3 parts by weight per 100 parts resin and the relative amount of metal carboxylate present is in the range of about 0.1 to about 5 parts by weight per 100 parts resin.

* * * * *

UNITED STATES PATENT OFFICE
CERTIFICATE OF CORRECTION

PATENT NO. : 3,887,508
DATED : June 3, 1975
INVENTOR(S) : Dale J. Dieckmann

It is certified that error appears in the above-identified patent and that said Letters Patent are hereby corrected as shown below:

Col. 1, line 10 "sulfurcontaining" should be --sulfur-containing--

Col. 2, line 2 "compositions" should be --composition--

Col. 3, line 16 "sulfure" should be --sulfur--

Col. 6, line 47 "0" should be --"O"--

UNITED STATES PATENT OFFICE
CERTIFICATE OF CORRECTION

PATENT NO. : 3,887,508
DATED : June 3, 1975
INVENTOR(S) : Dale J. Dieckmann

It is certified that error appears in the above-identified patent and that said Letters Patent are hereby corrected as shown below:

Col. 7, Table I

TABLE I

|     |      | Calcium Stearate |      |      |      |      |
|-----|------|------|------|------|------|------|
|     |      | 0    | .1   | .25  | .5   | 1.0  | 2.0  |
|     | 0    | 0'   | 0'   | 0'   | 0'   | 0'   | 0'   |
|     | .1   | 10'  | 10'  | 15'  | 20'  | 30'  | 35'  |
|     | .25  | 20'  | 20'  | 20'  | 30'  | 40'  | 50'  |
| ATG | .5   | 30'  | 35'  | 40'  | 50'  | 60'  | 70'  |
|     | 1.0  | 50'  | 60'  | 70'  | 70'  | 95'  | 95'  |
|     | 2.0  | 90'  | 110' | 110' | 125' | 140' | 95'  | should be --

TABLE I

Calcium Stearate

|     |      | 0    | .1   | .25  | .5   | 1.0  | 2.0  |
|-----|------|------|------|------|------|------|------|
|     | 0    | 0'   | 0'   | 0'   | 0'   | 0'   | 0'   |
|     | .1   | 10'  | 10'  | 15'  | 20'  | 30'  | 35'  |
|     | .25  | 20'  | 20'  | 20'  | 30'  | 40'  | 50'  |
| ATG | .5   | 30'  | 35'  | 40'  | 50'  | 60'  | 70'  |
|     | 1.0  | 50'  | 60'  | 70'  | 70'  | 95'  | 95'  |
|     | 2.0  | 90'  | 110' | 110' | 125' | 140' | 95'  |

UNITED STATES PATENT OFFICE
CERTIFICATE OF CORRECTION

PATENT NO. : 3,887,508
DATED : June 3, 1975
INVENTOR(S) : Dale J. Dieckmann

It is certified that error appears in the above-identified patent and that said Letters Patent are hereby corrected as shown below:

Col. 7, line 30 "ATC" should be --ATG--

Col. 9, line 62 "over" should be --oven--

Signed and Sealed this thirtieth Day of September 1975

[SEAL]

Attest:

RUTH C. MASON
Attesting Officer

C. MARSHALL DANN
Commissioner of Patents and Trademarks